(12) United States Patent
Shoji et al.

(10) Patent No.: US 11,011,800 B2
(45) Date of Patent: May 18, 2021

(54) CONDUCTIVE MODULE

(71) Applicants: Yazaki Corporation, Tokyo (JP); TOYOTA JIDOSHA KABUSHIKI KAISHA, Aichi-ken (JP)

(72) Inventors: Takao Shoji, Shizuoka (JP); Shigeyuki Ogasawara, Shizuoka (JP); Michio Ota, Shizuoka (JP); Hideki Inoue, Shizuoka (JP); Takenori Tsuchiya, Aichi-ken (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 413 days.

(21) Appl. No.: 15/960,526

(22) Filed: Apr. 23, 2018

(65) Prior Publication Data

US 2018/0337387 A1    Nov. 22, 2018

(30) Foreign Application Priority Data

May 22, 2017 (JP) .............................. JP2017-100623

(51) Int. Cl.
*H01M 10/48* (2006.01)
*H01M 50/502* (2021.01)
*H01M 50/20* (2021.01)

(52) U.S. Cl.
CPC ....... *H01M 50/502* (2021.01); *H01M 10/482* (2013.01); *H01M 50/20* (2021.01); *H01M 2220/20* (2013.01)

(58) Field of Classification Search
CPC .. H01M 2/206; H01M 2/1077; H01M 2/1083; H01M 10/482; H01M 50/20; H01M 50/502
See application file for complete search history.

(56) References Cited

U.S. PATENT DOCUMENTS

2014/0057152 A1   2/2014  Furuya et al.
2018/0175344 A1   6/2018  Ogasawara et al.
(Continued)

FOREIGN PATENT DOCUMENTS

JP    2011-60437 A    3/2011
JP    2013-4501 A     1/2013
(Continued)

*Primary Examiner* — Ula C Ruddock
*Assistant Examiner* — Frank A Chernow
(74) *Attorney, Agent, or Firm* — Kenealy Vaidya LLP

(57) ABSTRACT

A conductive module includes a first conductive member electrically connected to at least one electrode terminal of a battery module, a second conductive member electrically connected to the first conductive member and an electrical connection target, and an accommodation member accommodating the first and second conductive members. The accommodation member includes an accommodation body having a first accommodation chamber that accommodates the first conductive member and a second accommodation chamber that accommodates the second conductive member, a lid body closing an opening of the second accommodation chamber such that the second conductive member does not come out of the second accommodation chamber, and a hinge body rotating the lid body, a first holding mechanism holding a side of the lid body opposite to the hinge body at the closing position, and a second holding mechanism holding the hinge body side of the lid body at the closing position.

12 Claims, 12 Drawing Sheets

(56) References Cited

U.S. PATENT DOCUMENTS

2018/0337386 A1 11/2018 Ogasawara et al.
2018/0337388 A1 11/2018 Chaen

FOREIGN PATENT DOCUMENTS

| | | |
|---|---|---|
| JP | 2014-93218 A | 5/2014 |
| JP | 2015-138605 A | 7/2015 |
| JP | 2018-101546 A | 6/2018 |
| JP | 2018-195446 A | 12/2018 |
| JP | 2018-195504 A | 12/2018 |

CONDUCTIVE MODULE

CROSS-REFERENCE TO RELATED APPLICATION(S)

The present application claims priority to and incorporates by reference the entire contents of Japanese Patent Application No. 2017-100623 filed in Japan on May 22, 2017.

BACKGROUND OF THE INVENTION

1. Field of the Invention

The present invention relates to a conductive module.

2. Description of the Related Art

Conventionally, in vehicles such as electric automobiles and hybrid cars, a battery pack for supplying electric power to a rotary machine as a driving source thereof is mounted. Further, the battery pack is provided with a conductive module that is electrically connected to at least one of a plurality of battery cells forming a battery module. The conductive module includes a first conductive member electrically connected to an electrode terminal of the battery cell, a second conductive member electrically connected to each of the first conductive member and an electric connection target side, and an accommodation member that accommodates the first and the second conductive members. The accommodation member includes an accommodation body having a first accommodation chamber in which the first conductive member is accommodated and a second accommodation chamber in which the second conductive member is accommodated, and a lid body that closes at least a part of an opening of the second accommodation chamber such that the second conductive member does not come out of the second accommodation chamber. Further, the accommodation member includes a hinge body that rotates the lid body with respect to the accommodation body between an opening position with respect to the opening of the second accommodation chamber and a closing position with respect to the opening of the second accommodation chamber and a holding mechanism that holds the lid body to the accommodation body at the closing position. This accommodation member is formed using an insulating material such as synthetic resin, in which a so-called living hinge that is flexible and thin is formed as the hinge body. This type of conductive module is disclosed, for example, in Japanese Patent Application Laid-open No. 2013-4501. Japanese Patent Application Laid-open No. 2013-4501 discloses a so-called bus bar module which includes bus bars as first conductive members and electric wires as second conductive members, connects each battery cell in series or in parallel via the plurality of bus bars, and performs voltage detection of the respective battery cells with the electric wires.

Meanwhile, the hinge body of the conductive module is configured to enable opening and closing of the lid body by utilizing the flexibility thereof, but there is a risk of causing deterioration of durability, for example, because the opening and closing is repeated or an excessive load is applied. In such a conductive module, since the holding mechanism of the accommodation member is arranged on a side opposite to the hinge body, there is a possibility that variation may occur in a closed state of the opening of the second accommodation chamber using the lid body along with progress of the deterioration of durability of the hinge body.

SUMMARY OF THE INVENTION

Therefore, an object of the present invention is to provide a conductive module capable of stably maintaining a closed state of an opening using a lid body.

In order to achieve the above-mentioned object, a conductive module according to one aspect of the present invention includes a first conductive member that is electrically connected to at least one electrode terminal of a battery module in which a plurality of battery cells each having positive and negative electrode terminals are arranged, a second conductive member that extends in an arrangement direction of the plurality of battery cells and is electrically connected to the first conductive member and an electrical connection target, and an accommodation member in which the first and second conductive members are accommodated, wherein the accommodation member includes an accommodation body that has a first accommodation chamber in which the first conductive member is accommodated and a second accommodation chamber in which the second conductive member is accommodated, a lid body that closes an opening of the second accommodation chamber such that the second conductive member does not come out of the second accommodation chamber, a hinge body that is a living hinge connecting the second accommodation chamber side of the accommodation body and the lid body, and rotates the lid body with respect to the accommodation body between an opening position with respect to the opening of the second accommodation chamber and a closing position with respect to the opening of the second accommodation chamber, a first holding mechanism that holds a side of the lid body opposite to the hinge body onto the accommodation body at the closing position, and a second holding mechanism that holds the hinge body side of the lid body onto the accommodation body at the closing position.

According to another aspect of the present invention, in the conductive module, the second accommodation chamber may be arranged so as to open the opening in a direction intersecting with a vehicle vertical direction, the hinge body may be arranged so as to connect the lid body to the accommodation body on a vehicle lower side with respect to the second accommodation chamber, the first holding mechanism may be configured to hold a vehicle upper side of the lid body to the accommodation body at the closing position, and the second holding mechanism may be configured to hold a vehicle lower side of the lid body to the accommodation body at the closing position.

According to still another aspect of the present invention, in the conductive module, each of the first holding mechanism and the second holding mechanism may include a first engagement holding body provided on the accommodation body and a second engagement holding body provided on the lid body, and may be formed such that the lid body is held to the accommodation body at the closing position by engaging the first engagement holding body and the second engagement holding body with each other at the closing position.

According to still another aspect of the present invention, in the conductive module, the first conductive member may be electrically connected to an electrode terminal serving as a total positive electrode or a total negative electrode in the battery module, and the second conductive member may be a power cable that includes a core wire extending in the arrangement direction of the plurality of battery cells and a sheath covering the core wire, and electrically connects the first conductive member and an inverter serving as the electrical connection target.

According to still another aspect of the present invention, in the conductive module, the first conductive member may electrically connect two electrode terminals adjacent to each other in the arrangement direction of the plurality of battery cells, and the second conductive member may be a voltage detection line that includes a core wire extending in the arrangement direction of the plurality of battery cells and a sheath covering the core wire, and electrically connects the first conductive member and a battery monitoring unit serving as the electrical connection target.

The above and other objects, features, advantages and technical and industrial significance of this invention will be better understood by reading the following detailed description of presently preferred embodiment of the invention, when considered in connection with the accompanying drawings.

DETAILED DESCRIPTION OF THE PREFERRED EMBODIMENTS

Hereinafter, an embodiment of a conductive module according to the present invention will be described in detail with reference to the drawings. Incidentally, the present invention is not limited to the present embodiment.

Embodiment

One embodiment of the conductive module according to the present invention will be described with reference to FIGS. 1 to 12.

Figure 1:
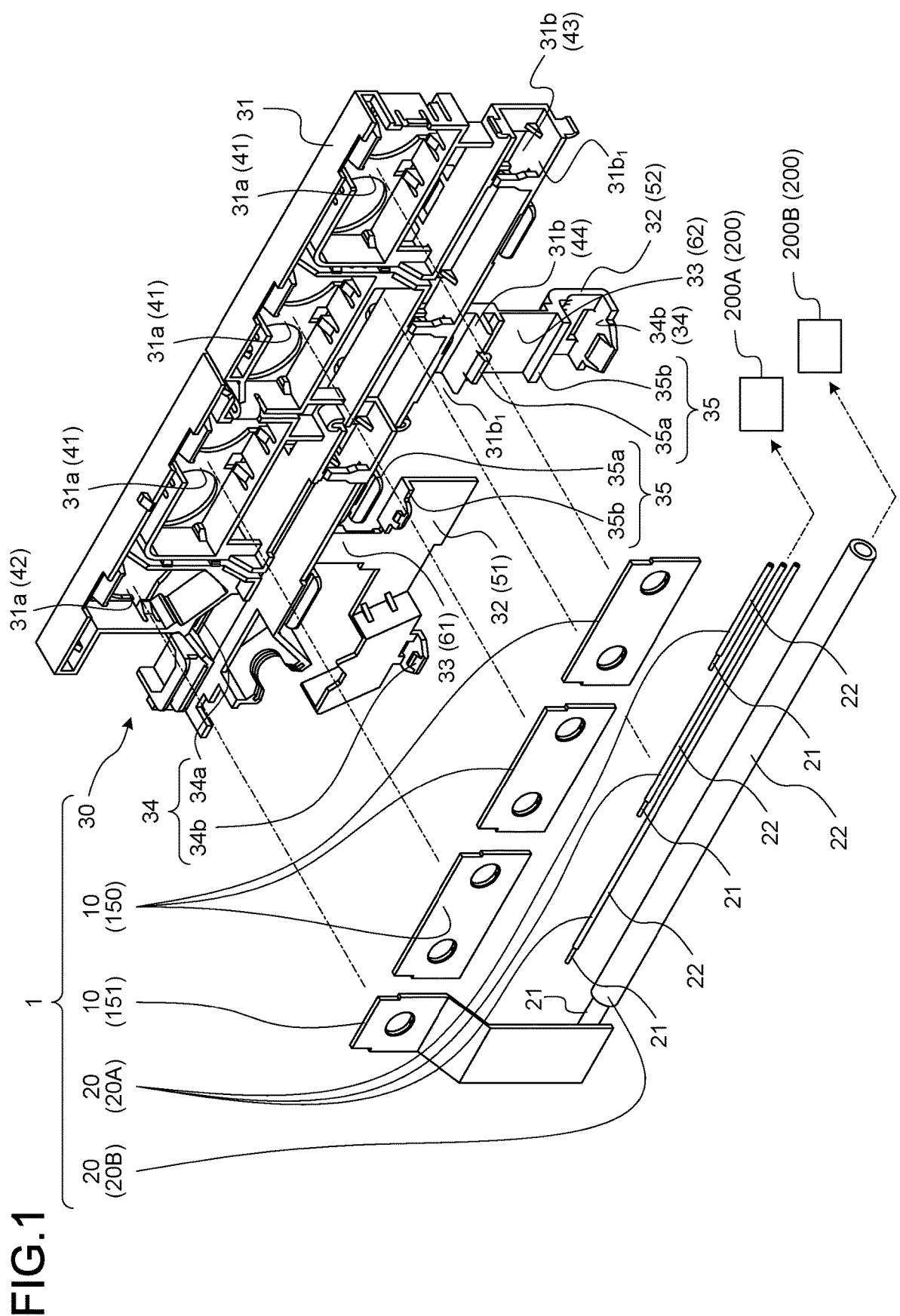
FIG. 1 is a perspective view illustrating a conductive module according to an embodiment.

In FIG. 1, reference numeral 1 represents a conductive module according to this embodiment. The conductive module 1 is electrically connected to at least one electrode terminal of a battery module 110 (FIG. 2), and forms a battery pack 100 together with the battery module 110. The battery pack 100 is mounted in a vehicle (an electric automobile, a hybrid car, or the like) having a rotary machine as a driving source, and is used for supply of electric power to the rotary machine or the like. A plurality of battery cells 120 are arranged in the battery module 110. First, the battery module 110 as a connection target of the conductive module 1 will be described. Note that the conductive module 1 of FIG. 1 and the battery module 110 of FIG. 2 are illustrated by extracting each part thereof.

Figure 2:
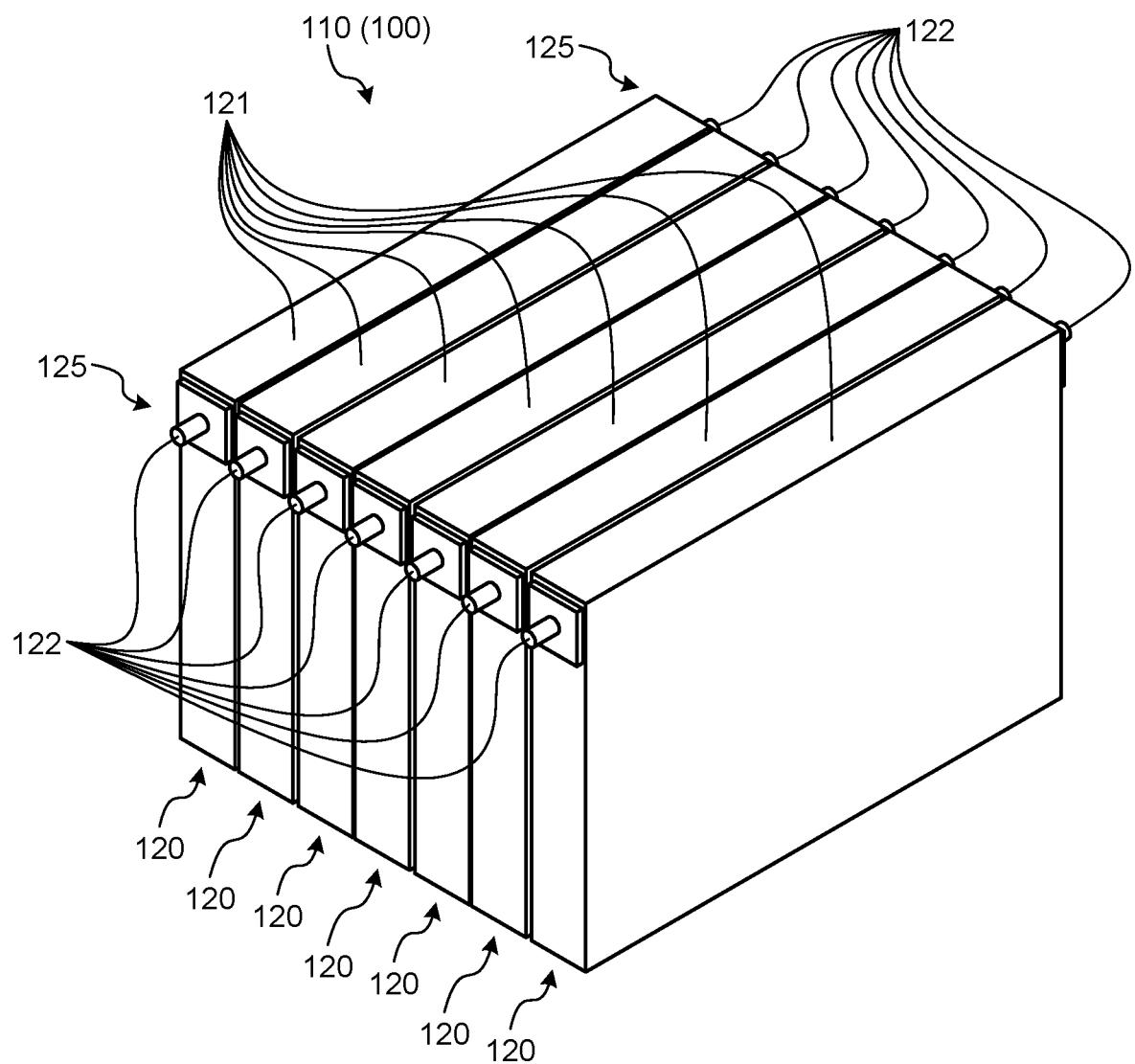
FIG. 2 is a perspective view illustrating a battery module.

The battery cell 120 includes a cell body 121 and two electrode terminals 122 (FIG. 2). Each of the electrode terminals 122 is provided at any place of the cell body 121 in the state of being exposed to an outside, one of which serves as a positive electrode and the other of which serves as a negative electrode. Each of the electrode terminals 122 is, for example, a plate-shaped terminal provided on an outer wall surface of the cell body 121, or a columnar pole protruding from the outer wall surface of the cell body 121. When the cell body 121 has a plurality of outer wall surfaces in the battery cells 120, each of the electrode terminals 122 may be arranged on one outer wall surface, or the outer wall surfaces on which the electrode terminals 122 are arranged may be divided for each of the electrode terminals 122. In the battery module 110, the respective battery cells 120 are arranged in series in a state where the electrode terminals 122 of any one of battery cells 120 are aligned in a row and the other electrode terminals 122 are also aligned in a row. Thus, electrode terminal groups 125 formed of the electrode terminals 122 aligned in a row are provided at two places in the battery module 110.

In this battery module 110, two electrode terminals 122, adjacent in the arrangement direction of the plurality of battery cells 120, are connected to each of the electrode terminal groups 125 via a conductive bus bar 150 (FIG. 1). The bus bar 150 is molded using a conductive material such as metal and is provided for each combination of the two adjacent electrode terminals 122 to physically and electrically connect the two electrode terminals 122 for each combination thereof. The bus bar 150 in this example is formed in a rectangular flat plate shape, and a plurality of bus bars 150 are arranged for each of the electrode terminal groups 125 along the arrangement direction of the battery cells 120. For example, when the electrode terminal 122 has a plate shape, the bus bar 150 is physically and electrically connected to the electrode terminal 122 by welding (laser welding or the like). On the other hand, when the electrode terminal 122 is a pole, a through-hole through which each of the electrode terminals 122 is inserted is formed in the bus bar 150, and the bus bar 150 is fixed to the electrode terminal 122 by screwing or the like so that the bus bar 150 and the electrode terminal 122 are physically and electrically connected to each other.

Further, there are two electrode terminals 122, which are not connected to each other via the bus bar 150, in the battery module 110, and one thereof serves as a so-called total positive electrode and the other serves as a so-called total negative electrode. In this battery module 110, a bus bar 151 is electrically connected to the electrode terminal 122 serving as the total positive electrode or the total negative electrode (FIG. 1). The bus bar 151 in this example is formed in a plate shape using a conductive material such as metal. For example, when the electrode terminal 122 serving as the total positive electrode or the total negative electrode has a plate shape, the bus bar 151 is physically and electrically connected to this electrode terminal 122 by welding (laser welding or the like). On the other hand, when the electrode terminal 122 serving as the total positive electrode or the total negative electrode is a pole, a through-hole through which this electrode terminal 122 is inserted is formed in the bus bar 151, and the bus bar 151 is fixed to the electrode terminal 122 by screwing or the like so that the bus bar 151 and the electrode terminal 122 are physically and electrically connected to each other.

For example, the cell body 121 forms a rectangular parallelepiped in the battery cell 120 according to the present embodiment. Thus, the battery module 110 according to the present embodiment virtually forms a rectangular parallelepiped with the respective battery cells 120, and has six wall surfaces of an aggregate that is formed of the plurality of battery cells 120 along the arrangement direction of the plurality of battery cells 120. In addition, stud bolts are vertically provided from two opposing outer wall surfaces of the cell body 121 in the battery cell 120 of the present embodiment, and each of the stud bolts is used as the electrode terminal 122. Thus, the battery module 110 of the present embodiment is provided with the electrode terminal groups 125, respectively, on two opposing wall surfaces among the six wall surfaces forming the rectangular parallelepiped. Further, the bus bar 150 of the present embodiment has the through-holes through which the two adjacent electrode terminals 122 are inserted. In addition, the bus bar 151 of the present embodiment has the through-hole through which the electrode terminal 122 serving as the total positive electrode or the total negative electrode is inserted. For example, the battery module 110 is mounted in the vehicle such that each axis direction of the electrode terminals 122 intersects (in this case, orthogonal to) a vehicle vertical direction.

The conductive module 1 of the present embodiment is connected to at least one of the respective electrode terminal groups 125 with respect to the battery module 110 configured in this manner.

The conductive module 1 includes a first conductive member 10, a second conductive member 20, and an accommodation member 30 that houses the first and second conductive members 10 and 20 (FIG. 1).

The first conductive member 10 is formed using a conductive material such as metal. The first conductive member 10 is electrically connected to at least one of the electrode terminals 122 of the battery module 110. The first conductive member 10 may be electrically connected to the electrode terminal 122 directly or indirectly. Here, it is possible to directly (that is, physically) and electrically connect the first conductive member 10 and the electrode terminal 122 by, for example, inserting the pole-shaped electrode terminal 122 through the respective through-holes of the first conductive member 10 having the flat plate shape and the bus bar 150 (or the bus bar 151) and fastening these parts together with a screw member. Here, the first conductive member 10 electrically connects the two electrode terminals 122 adjacent in the arrangement direction of the plurality of battery cells 120 by utilizing the bus bar 150 directly as the first conductive member 10. In addition, the first conductive member 10 is electrically connected to the electrode terminal 122 serving as the total positive electrode or the total negative electrode in the battery module 110 by utilizing the bus bar 151 directly as the first conductive member 10. That is, the first conductive member 10 can be directly (physically) and electrically connected to the electrode terminal 122 by utilizing the bus bar 150 (or the bus bar 151) directly as the first conductive member 10. Further, here, the electrical connection between the first conductive member 10 and the electrode terminal 122 can be made indirect by physically and electrically connecting the first conductive member 10 to the bus bar 150 (or the bus bar 151) by welding (laser welding or the like). In this example, the bus bars 150 and 151 are used as the first conductive members 10, respectively.

The second conductive member 20 extends in the arrangement direction of the plurality of battery cells 120 in a state where the conductive module 1 is attached to the battery module 110 (FIG. 1). The second conductive member 20 electrically connects the first conductive member 10 and an electrical connection target 200 by being electrically connected to the first conductive member 10 and the electrical connection target 200. The second conductive member 20 has a conductor 21 extending in the arrangement direction of the plurality of battery cells 120, and the conductor 21 is electrically connected to the first conductive member 10 and the electrical connection target 200.

Here, a battery monitoring unit 200A that monitors a battery state (voltage, current, temperature, and the like) of the battery cell 120, an inverter 200B that drives the rotary machine, and the like are conceivable as the electrical connection target 200. For example, when the first conductive member 10 is the bus bar 150, the battery monitoring unit 200A is applied as the electrical connection target 200. In this case, an electric wire (hereinafter referred to as a "voltage detection line") 20A including a conductor 21 serving as a core wire and a sheath 22 covering the conductor 21 is used as the second conductive member 20. The voltage detection line 20A as the second conductive member 20 electrically connects the bus bar 150 as the first conductive member 10 and the battery monitoring unit 200A as the electrical connection target 200. The voltage detection line 20A is provided for each of the bus bars 150. In addition, when the first conductive member 10 is the bus bar 151, the inverter 200B is applied as the electrical connection target 200. In this case, a high-voltage electric wire (hereinafter referred to as a "power cable") 20B including a conductor 21 serving as a core wire and a sheath 22 covering the conductor 21 is used as the second conductive member 20. The power cable 20B as the second conductive member 20 electrically connects the bus bar 151 as the first conductive member 10 and the inverter 200B as the electrical connection target 200. Incidentally, the core wire may be a rod-shaped conductor formed into a columnar shape, or may be a bundle of a plurality of strands (for example, a twisted wire formed by twisting a plurality of strands).

The accommodation member 30 is formed using an insulating material such as synthetic resin. The accommodation member 30 has an accommodation body 31 in which the first and second conductive members 10 and 20 are accommodated (FIGS. 1 and 3 to 6). The accommodation body 31 includes a first accommodation chamber 31a in which the first conductive member 10 is accommodated and a second accommodation chamber 31b in which the second conductive member 20 is accommodated.

This accommodation body 31 is provided, as the first accommodation chamber 31a, with a first bus bar accommodation chamber 41 in which the bus bar 150 serving as the first conductive member 10 is accommodated and a second bus bar accommodation chamber 42 in which the bus bar 151 serving as the first conductive member 10 is accommodated (FIGS. 1 and 3 to 6). The first bus bar accommodation chamber 41 is provided for each of the bus bars 150. In the accommodation body 31, the respective first bus bar accommodation chambers 41 are arranged to be aligned along the arrangement direction of the plurality of battery cells 120. Meanwhile, the bus bar 151 for any one of the total positive electrode and the total negative electrode is accommodated in the accommodation body 31, only the single second bus bar accommodation chamber 42 is provided. The second bus bar accommodation chamber 42 is arranged at one end in the arrangement direction of each of the first bus bar accommodation chambers 41 to be aligned in the arrangement direction.

In addition, this accommodation body 31 is provided, as the second accommodation chamber 31$b$, with a first electric wire accommodation chamber 43 in which the voltage detection line 20A serving as the second conductive member 20 is accommodated, and a second electric wire accommodation chamber 44 in which the power cable 20B serving as the second conductive member 20 is accommodated (FIGS. 1 and 3 to 6). The first electric wire accommodation chamber 43 is provided as one room in which the plurality of voltage detection lines 20A led from the respective first bus bar accommodation chambers 41 are accommodated. The first electric wire accommodation chamber 43 extends along the arrangement direction of the plurality of battery cells 120. Further, the first electric wire accommodation chamber 43 is arranged to be aligned in an intersecting direction (here, an orthogonal direction) with respect to an arrangement direction of the first bus bar accommodation chamber 41 and the second bus bar accommodation chamber 42 arranged in the arrangement direction. A plurality of the second electric wire accommodation chambers 44 are provided at intervals in the arrangement direction of the plurality of battery cells 120 although not illustrated. The second electric wire accommodation chamber 44 is arranged to be aligned in an intersecting direction (here, an orthogonal direction) with respect to an arrangement direction of the first electric wire accommodation chamber 43 on a side opposite to the first bus bar accommodation chamber 41 and the second bus bar accommodation chamber 42. The second accommodation chamber 31$b$ (the first electric wire accommodation chamber 43 and the second electric wire accommodation chamber 44) in this example is arranged such that an opening 31$b_1$ is opened in an intersecting direction (here, an orthogonal direction) with respect to the vehicle vertical direction, in a state where the conductive module 1 is attached to the battery module 110.

The opening 31$b_1$ serves as an insertion opening at the time of accommodating the second conductive member 20 in the second accommodation chamber 31$b$. The voltage detection line 20A is accommodated in the first electric wire accommodation chamber 43 through the opening 31$b_1$. The power cable 20B is accommodated in the second electric wire accommodation chamber 44 through the opening 31$b_1$.

Further, the accommodation member 30 includes a lid body 32 that closes at least a part of the opening 31$b_1$ of the second accommodation chamber 31$b$, and a hinge body 33 that rotates the lid body 32 with respect to the accommodation body 31 (FIGS. 1 and 3 to 6). The lid body 32 closes at least a part of the opening 31$b_1$ of the second accommodation chamber 31$b$ such that the second conductive member 20 does not come out of the second accommodation chamber 31$b$. The hinge body 33 rotates the lid body 32 with respect to the accommodation body 31 between an opening position (FIGS. 1, 3, and 4) with respect to the opening 31$b_1$ of the second accommodation chamber 31$b$ and a closing position (FIGS. 5 and 6) with respect to the opening 31$b_1$ of the second accommodation chamber 31$b$. The lid body 32 can perform rotating movement with respect to the accommodation body 31 about a rotary shaft of the hinge body 33 between the closing position and the opening position. The hinge body 33 is arranged so as to connect the lid body 32 to the accommodation body 31 on a vehicle lower side with respect to the second accommodation chamber 31$b$.

In this accommodation member 30, the accommodation body 31, the lid body 32, and the hinge body 33 are integrally molded, and the hinge body 33 is interposed between the accommodation body 31 and the lid body 32 as a so-called living hinge. The living hinge is a flexible thin portion that is formed between the accommodation body 31 and the lid body 32, and is capable of displacing a position of the rotary shaft between the accommodation body 31 side and the lid body 32 side. The living hinge connects the second accommodation chamber 31$b$ side of the accommodation body 31, and the lid body 32. The hinge body 33 in this example has flexibility enough to allow rotation between the accommodation body 31 and the lid body 32, and is formed to be a rectangular thin flat plate. In addition, the hinge body 33 in this example connects the opening 31$b_1$ of the second accommodation chamber 31$b$ of the accommodation body 31 and the lid body 32. The hinge body 33 has the flat plate shape in an initial state, and the lid body 32 can be rotated with respect to the accommodation body 31 by folding the hinge body 33. In this example, a relative positional relationship between the accommodation body 31 and the lid body 32 in the initial state of the hinge body 33 is set as the opening position. In addition, the rotary shaft is displaced between the accommodation body 31 side and the lid body 32 side in the hinge body 33 depending on a folding position thereof.

The accommodation member 30 in this example is provided, as the lid body 32, with a first lid body 51 that closes at least a part of the opening 31$b_1$ in the first electric wire accommodation chamber 43 serving as the second accommodation chamber 31$b$, and a second lid body 52 that closes at least a part of the opening 31$b_1$ in the second electric wire accommodation chamber 44 serving as the second accommodation chamber 31$b$ (FIGS. 1 and 3 to 6).

In addition, the accommodation member 30 in this example is provided, as the hinge body 33, with a first hinge body 61 interposed between the first electric wire accommodation chamber 43 side of the accommodation body 31 and the first lid body 51, and a second hinge body 62 interposed between the second electric wire accommodation chamber 44 side of the accommodation body 31 and the second lid body 52 (FIGS. 1 and 3 to 6).

The first hinge body 61 is arranged so as to connect the first lid body 51 to the accommodation body 31 on the vehicle lower side with respect to the first electric wire accommodation chamber 43. In addition, the second hinge body 62 is arranged so as to connect the second lid body 52 to the accommodation body 31 on the vehicle lower side with respect to the second electric wire accommodation chamber 44.

Here, the first electric wire accommodation chamber 43 and the first lid body 51 have proximate portions which are proximate to each other when the first lid body 51 closes the opening 31$b_1$ of the first electric wire accommodation chamber 43. The proximate portions of the first electric wire accommodation chamber 43 and the first lid body 51 may be in contact with each other. Each of the first electric wire accommodation chamber 43 and the first lid body 51 has at least two proximate portions, and the respective proximate portions thereof face each other via the opening 31$b_1$.

Figure 3:
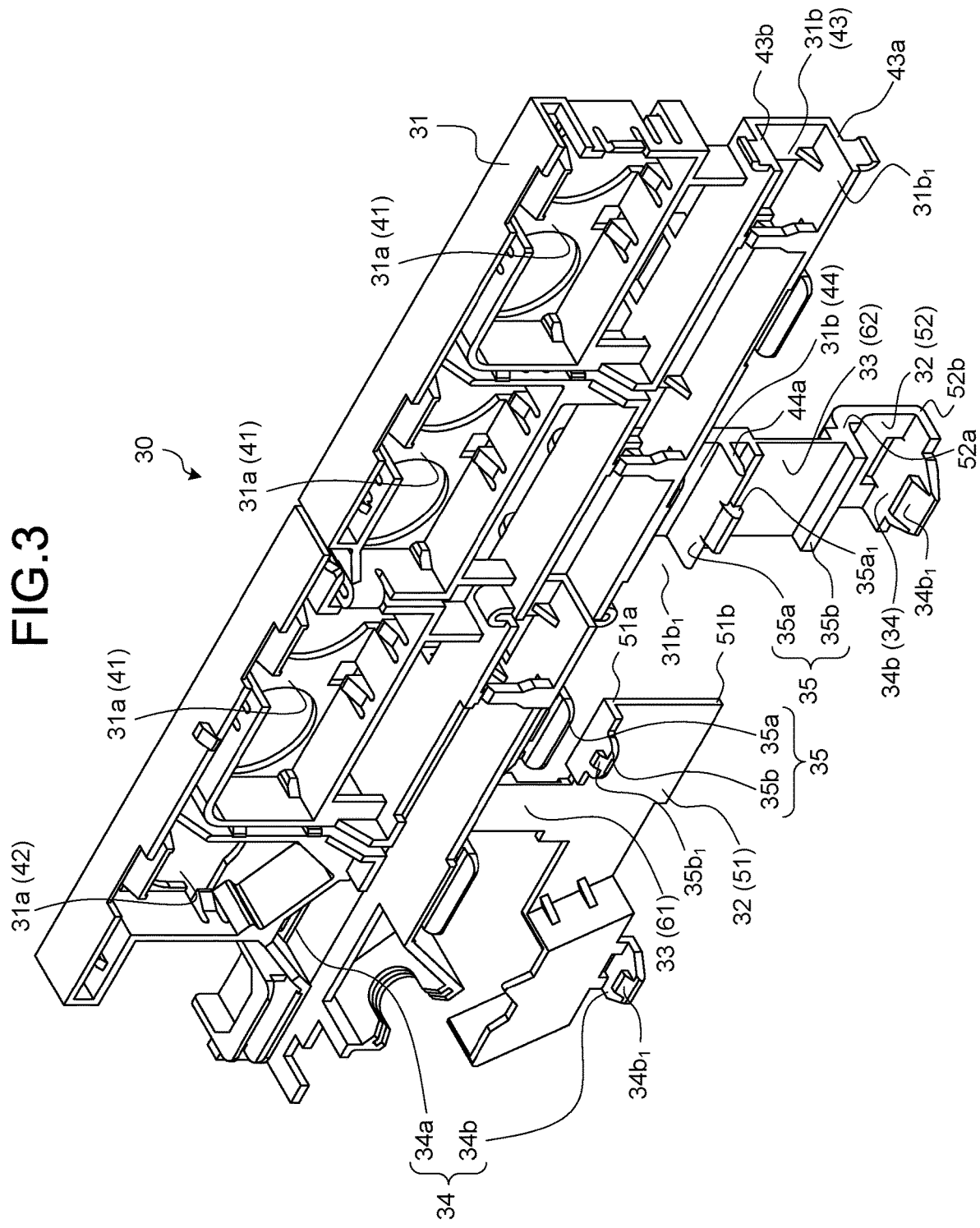
FIG. 3 is a perspective view illustrating a part of an accommodation member with a lid body being in an open state.
Figure 4:
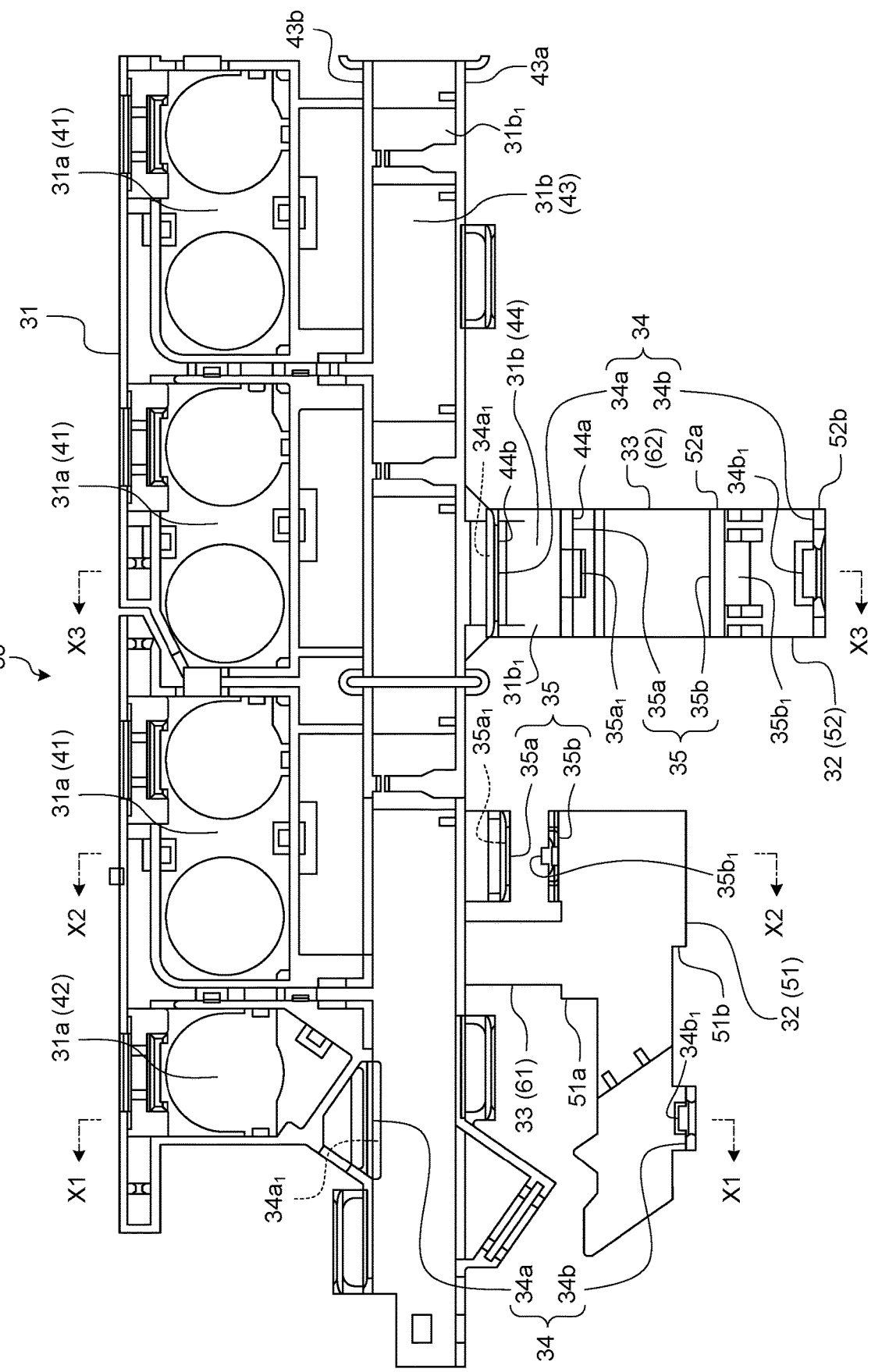
FIG. 4 is a plan view illustrating a part of the accommodation member with the lid body being in the open state.
Figure 5:
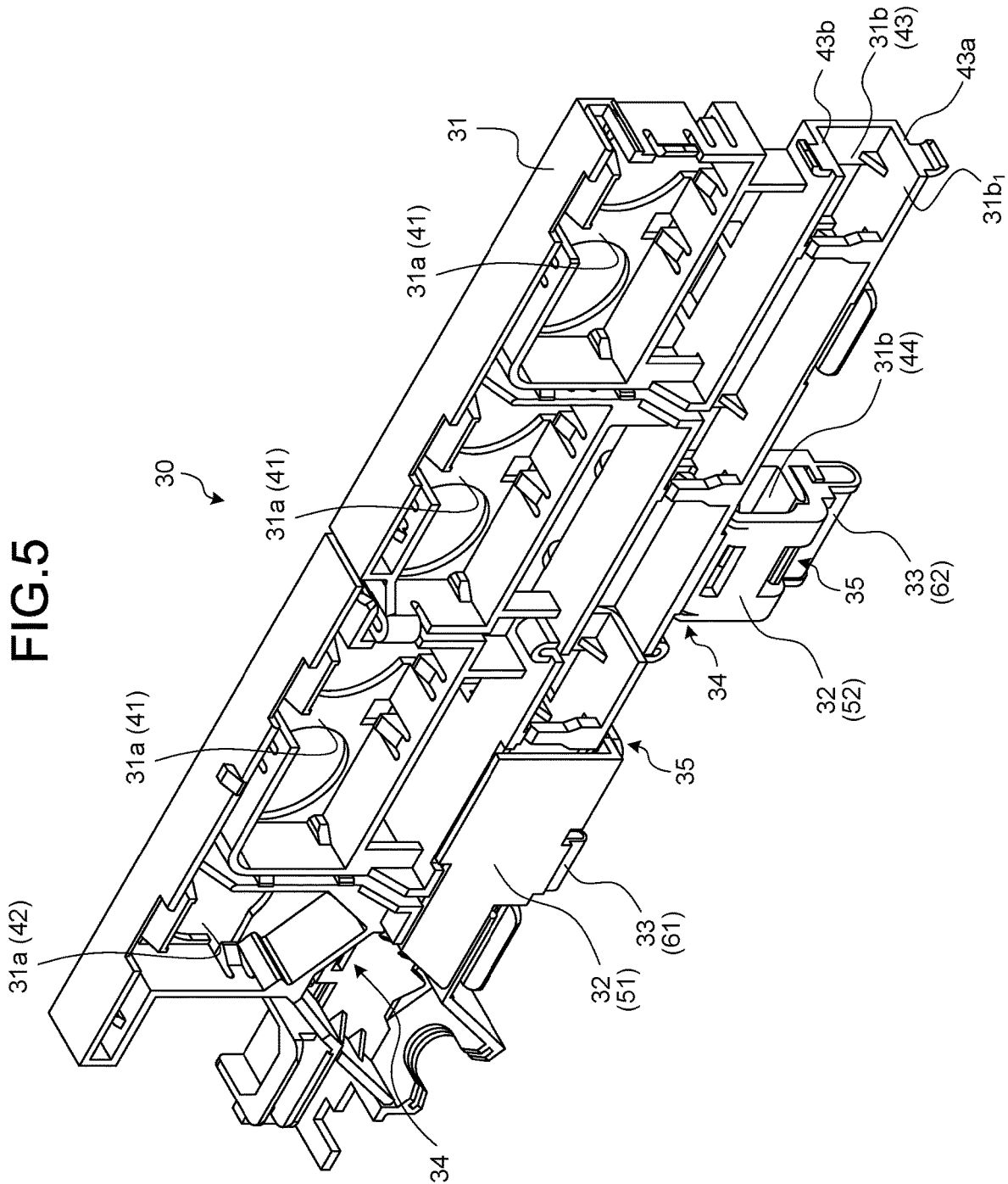
FIG. 5 is a perspective view illustrating a part of the accommodation member with the lid body being in a closed state.
Figure 6:
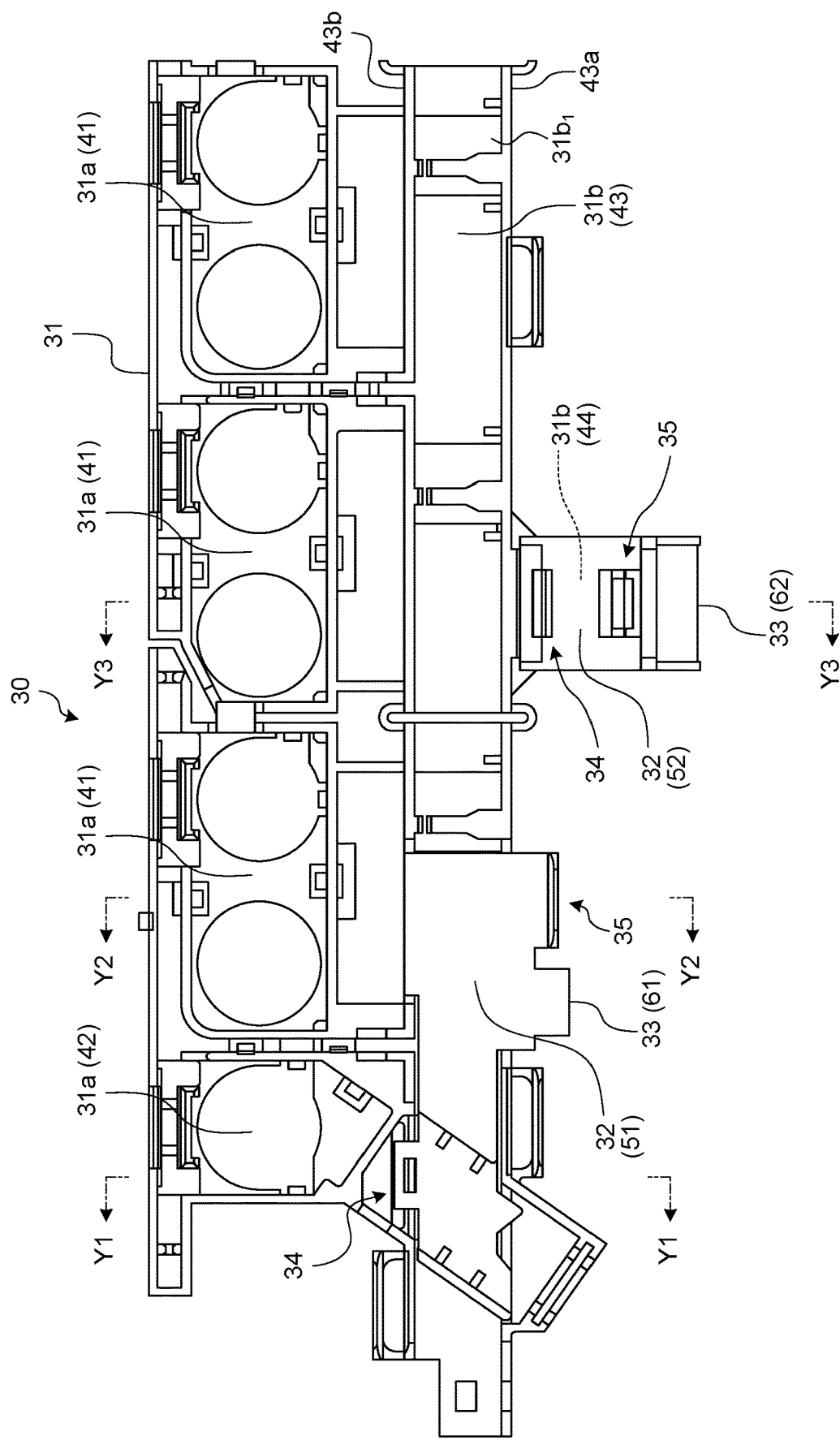
FIG. 6 is a plan view illustrating a part of the accommodation member with the lid body being in the closed state.
Figure 7:
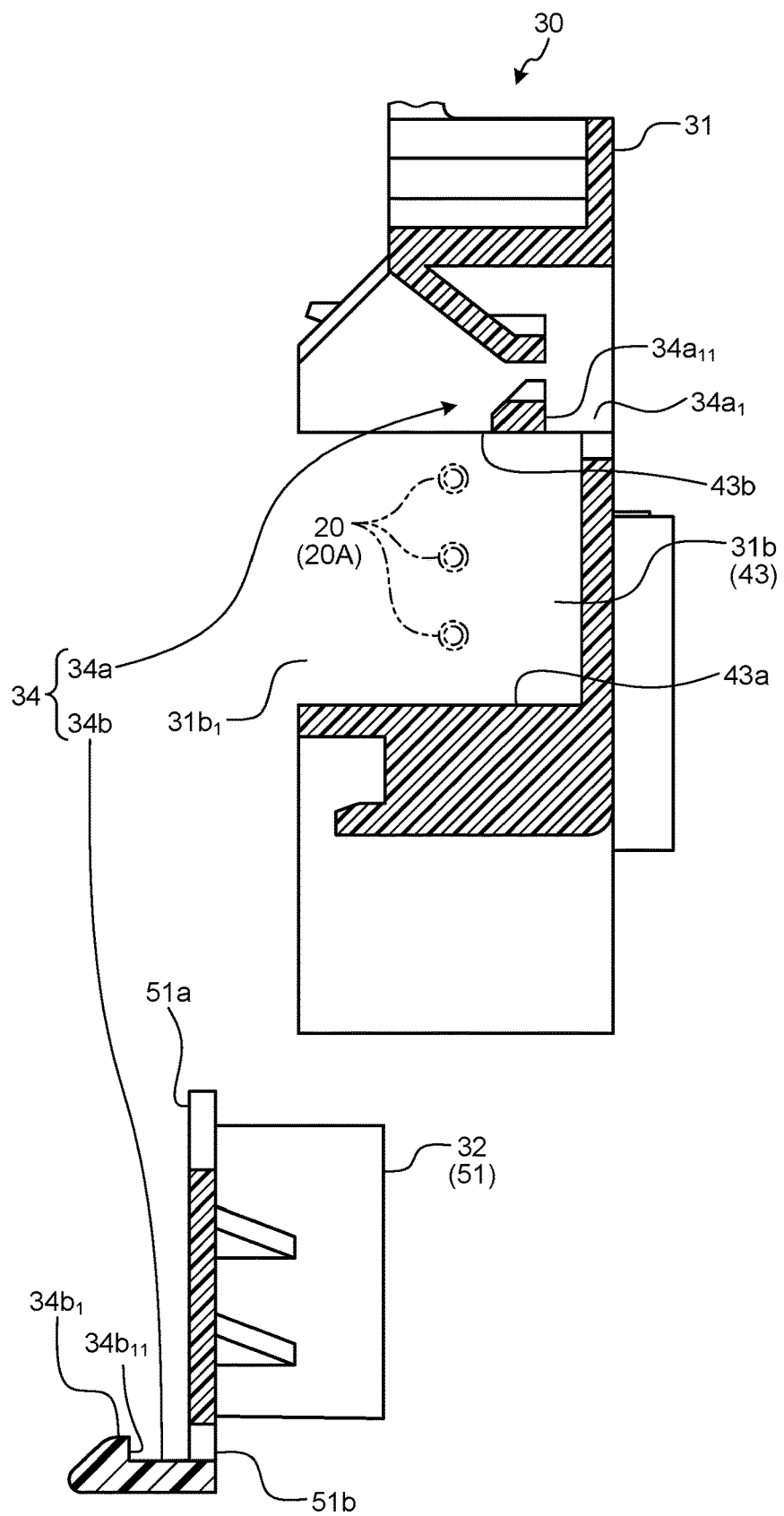
FIG. 7 is a cross-sectional view taken along a line X1-X1 of FIG. 4 and is an enlarged view of a first holding mechanism.
Figure 8:
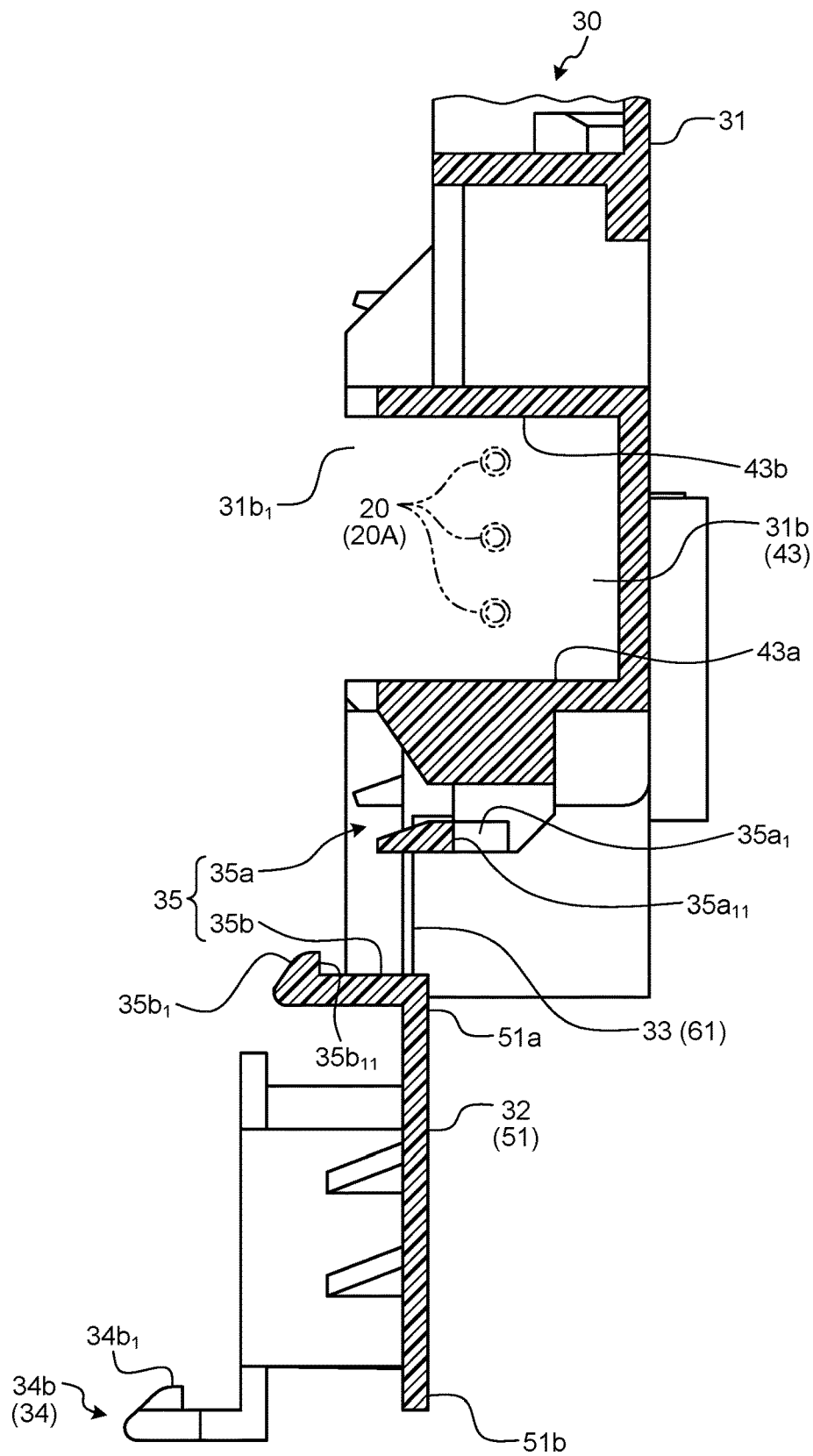
FIG. 8 is a cross-sectional view taken along a line X2-X2 of FIG. 4 and is an enlarged view of a second holding mechanism.
Figure 9:
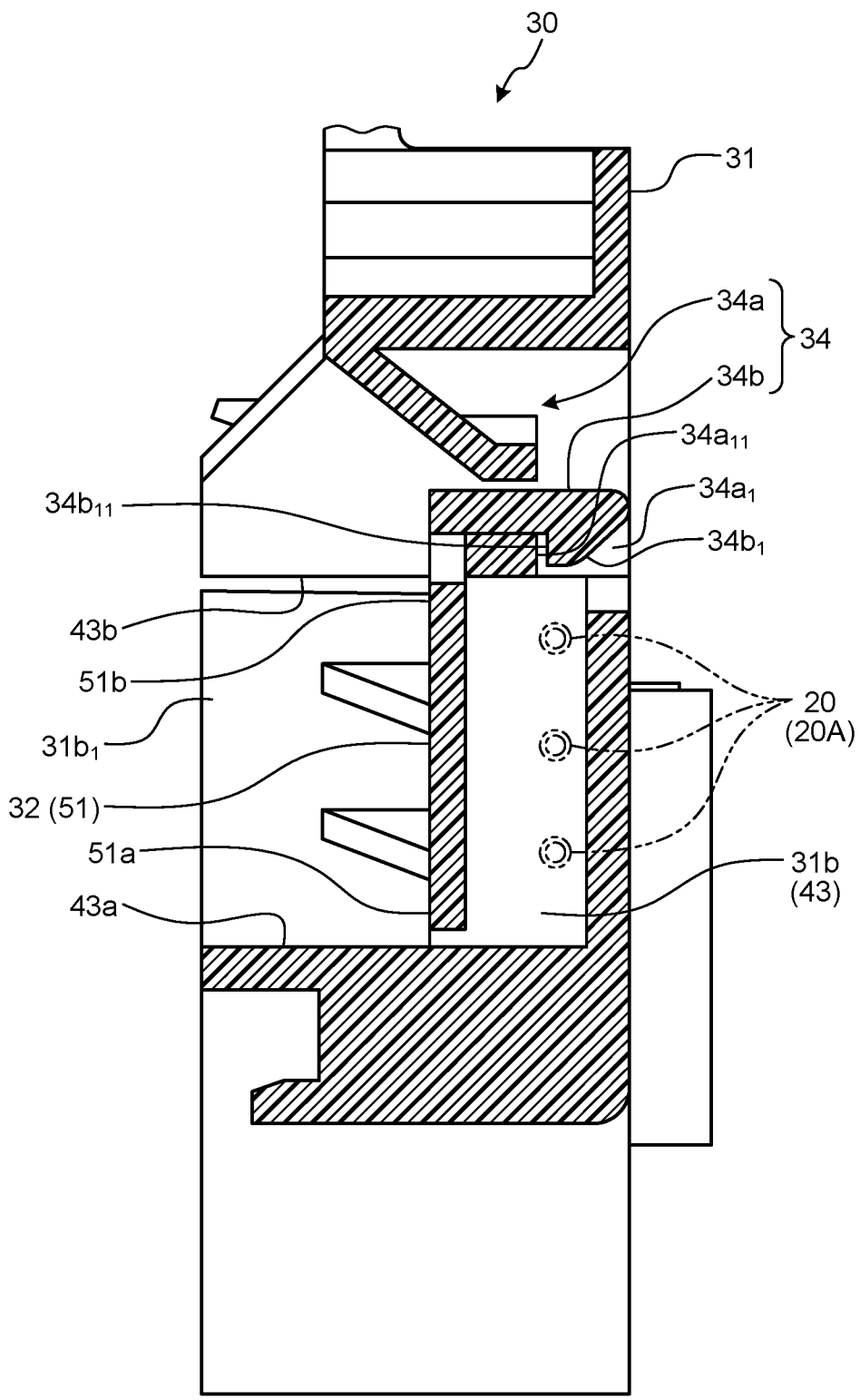
FIG. 9 is a cross-sectional view taken along a line Y1-Y1 of FIG. 6 and is an enlarged view of the first holding mechanism.
Figure 10:
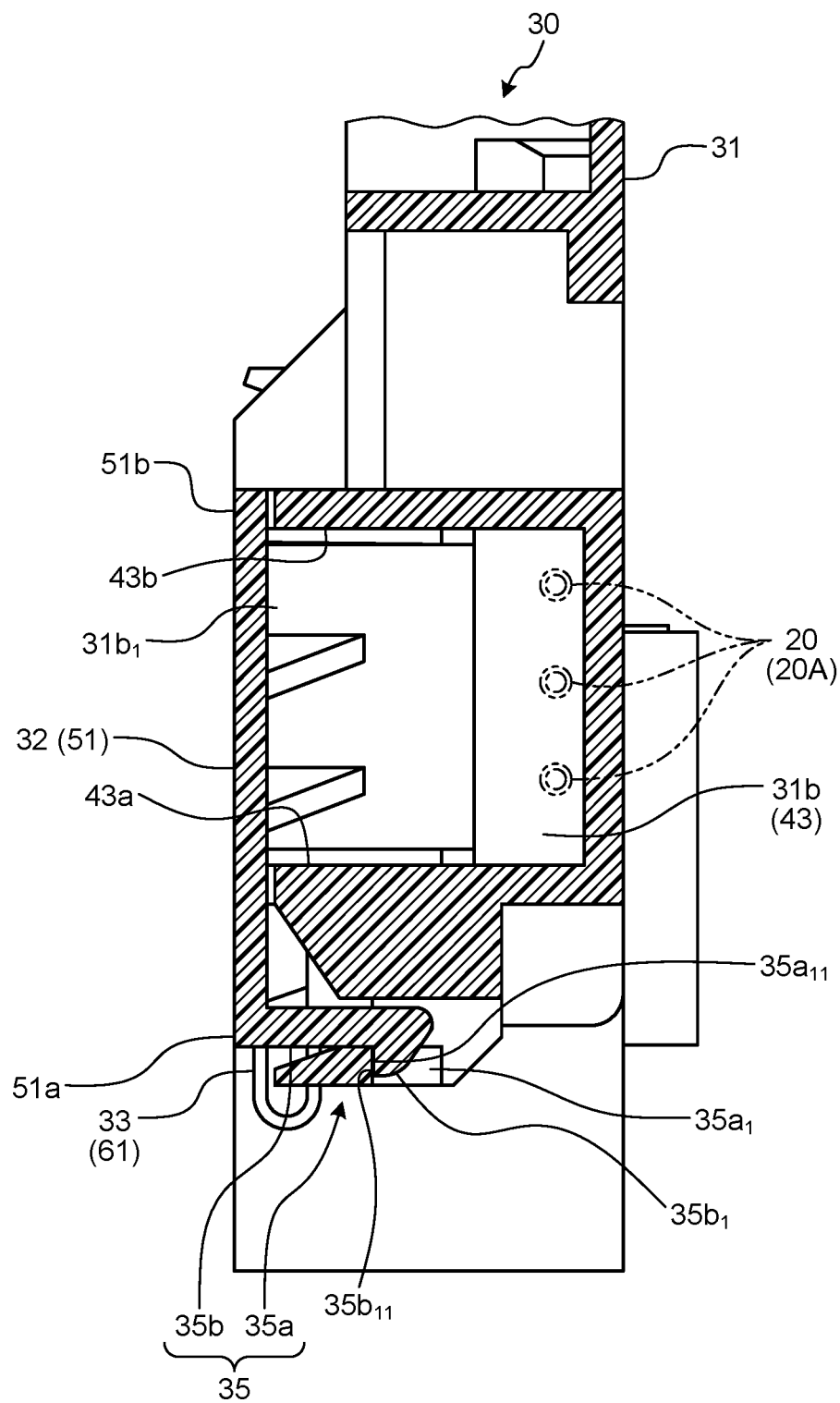
FIG. 10 is a cross-sectional view taken along a line Y2-Y2 of FIG. 6 and is an enlarged view of the second holding mechanism.

The proximate portion of the first electric wire accommodation chamber 43 is provided on a wall portion forming the first electric wire accommodation chamber 43. For example, the first electric wire accommodation chamber 43 includes a rotary shaft side (hereinafter referred to as an "inner wall portion") 43a of the wall portion to which the first hinge body 61 is connected, and a wall portion (hereinafter referred to as an "outer wall portion") 43b arranged to be spaced apart from the inner wall portion 43a with the interior of the first electric wire accommodation chamber 43 interposed therebetween (FIGS. 3 and 4). In the first electric wire accommodation chamber 43, proximate portions are provided on the inner wall portion 43a and the outer wall portion 43b. The proximate portions of the first electric wire accommodation chamber 43 are provided, for example, on a peripheral edge portion of the opening 31b$_1$ of the first electric wire accommodation chamber 43 which is a part of the inner wall portion 43a and the outer wall portion 43b, on the interior side with respect to the peripheral edge portion of the opening 31b$_1$ in the inner wall portion 43a and the outer wall portion 43b, and the like.

The proximate portion of the first lid body 51 is provided at a peripheral end portion, proximate to each of the inner wall portion 43a and the outer wall portion 43b, of the first electric wire accommodation chamber 43 at the closing position. For example, the first lid body 51 includes an end portion (hereinafter referred to as an "inner end portion") 51a on the rotary shaft side to which the first hinge body 61 is connected at the peripheral end portion thereof, and an end portion (hereinafter referred to as an "outer end portion") 51b arranged to be spaced apart from the inner end portion 51a (FIGS. 3 and 4). The inner end portion 51a and the outer end portion 51b are arranged at positions with the interior of the first electric wire accommodation chamber 43 interposed therebetween at the closing position. The first lid body 51 has the inner end portion 51a and the outer end portion 51b as the proximate portion (FIGS. 3 and 4). In the closing position, the inner end portion 51a is proximate to the inner wall portion 43a of the first electric wire accommodation chamber 43, and the outer end portion 51b is proximate to the outer wall portion 43b of the first electric wire accommodation chamber 43.

In addition, the second electric wire accommodation chamber 44 and the second lid body 52 have proximate portions which are proximate to each other when the second lid body 52 closes the opening 31b$_1$ of the second electric wire accommodation chamber 44. The proximate portions of the second electric wire accommodation chamber 44 and the second lid body 52 may be in contact with each other. Each of the second electric wire accommodation chamber 44 and the second lid body 52 has at least two proximate portions, and the respective proximate portions thereof face each other via the opening 31b$_1$.

The proximate portion of the second electric wire accommodation chamber 44 is provided on a wall portion forming the second electric wire accommodation chamber 44. For example, the second electric wire accommodation chamber 44 includes a rotary shaft side (hereinafter referred to as an "inner wall portion") 44a of the wall portion to which the second hinge body 62 is connected, and a wall portion (hereinafter referred to as an "outer wall portion") 44b arranged to be spaced apart from the inner wall portion 44a with the interior of the second electric wire accommodation chamber 44 interposed therebetween (FIGS. 3 and 4). In the second electric wire accommodation chamber 44, proximate portions are provided on the inner wall portion 44a and the outer wall portion 44b. The proximate portions of the second electric wire accommodation chamber 44 are provided, for example, on a peripheral edge portion of the opening 31b$_1$ of the second electric wire accommodation chamber 44 which is a part of the inner wall portion 44a and the outer wall portion 44b, on the interior side with respect to the peripheral edge portion of the opening 31b$_1$ in the inner wall portion 44a and the outer wall portion 44b, and the like.

The proximate portion of the second lid body 52 is provided at a peripheral end portion, proximate to each of the inner wall portion 44a and the outer wall portion 44b, of the second electric wire accommodation chamber 44 at the closing position. For example, the second lid body 52 includes an end portion (hereinafter referred to as an "inner end portion") 52a on the rotary shaft side to which the second hinge body 62 is connected at the peripheral end portion thereof, and an end portion (hereinafter referred to as an "outer end portion") 52b arranged to be spaced apart from the inner end portion 52a (FIGS. 3 and 4). The inner end portion 52a and the outer end portion 52b are arranged at positions with the interior of the second electric wire accommodation chamber 44 interposed therebetween at the closing position. The second lid body 52 has the inner end portion 52a and the outer end portion 52b as the proximate portion (FIGS. 3 and 4). In the closing position, the inner end portion 52a is proximate to the inner wall portion 44a of the second electric wire accommodation chamber 44, and the outer end portion 52b is proximate to the outer wall portion 44b of the second electric wire accommodation chamber 44.

Further, the accommodation member 30 has a first holding mechanism 34 and a second holding mechanism 35 (FIGS. 1 and 3 to 6) to hold the lid body 32 to the accommodation body 31 at the closing position. In the accommodation member 30, the first holding mechanism 34 and the second holding mechanism 35 are also molded to be integrated with the accommodation body 31, the lid body 32, and the hinge body 33. The first holding mechanism 34 is configured to hold a side of the lid body 32 opposite to the hinge body 33 in the accommodation body 31 at the closing position. The first holding mechanism 34 in this example is configured to hold a vehicle upper side of the lid body 32 to the accommodation body 31 at the closing position. On the other hand, the second holding mechanism 35 holds the hinge body 33 side of the lid body 32 to the accommodation body 31 at the closing position. The second holding mechanism 35 in this example is configured to hold a vehicle lower side of the lid body 32 to the accommodation body 31 at the closing position.

The first holding mechanism 34 and the second holding mechanism 35 include first engagement holding bodies 34a and 35a, respectively, provided in the accommodation body 31 and second engagement holding bodies 34b and 35b, respectively, provided in the lid body 32 (FIGS. 1, 3 and 4). The respective first holding mechanism 34 and the second holding mechanism 35 are formed such that the lid body 32 is held to the accommodation body 31 at the closing position by engaging the first engagement holding bodies 34a and 35a with the second engagement holding bodies 34b and 35b, respectively, at the closing position.

For example, in the first holding mechanism 34, each of the first engagement holding body 34a and the second engagement holding body 34b is preferably formed to have a claw portion and the respective claw portion are hooked by each other at the closing position. That is, the first engagement holding body 34a and the second engagement holding body 34b are preferably formed such that the lid body 32 is held to the accommodation body 31 at the closing position as the respective claw portions are hooked by each other. The claw portion is formed as a claw-shaped protruding portion in each of the first engagement holding body 34a and the second engagement holding body 34b. The second engagement holding body 34b rotates together with the lid body 32 along with the rotating movement of the lid body 32 toward the closing position side about the rotary shaft of the hinge body 33, and approaches the first engagement holding body 34a. In the first engagement holding body 34a and the second engagement holding body 34b, each claw portion climbs over a counterpart claw portion as the rotation motion progresses so that locking surfaces of the respective claw portions are arranged to face each other at the closing position. Thus, the locking surfaces of the respective claw portion are hooked by each other when the lid body 32 tries to move to the opening position with respect to the accommodation body 31 in the first engagement holding body 34a and the second engagement holding body 34b, so that the lid body 32 can be held to the accommodation body 31 at the closing position. The locking surfaces of the claw portions may be brought into contact with each other at the closing position or may be brought into contact with each other as the lid body 32 at the closing position moves toward the opening position side. Similarly, the first engagement holding body 35a and the second engagement holding body 35b are preferably formed in the second holding mechanism 35 such that the accommodation body 31 and the lid body 32 are held by claw portions of the first engagement holding body 35a and the second engagement holding body 35b.

Instead of the above-described configuration, in the first holding mechanism 34, the first engagement holding body 34a and the second engagement holding body 34b may be formed such that a claw portion of one of the holding bodies is inserted into an inserted portion provided in the other holding body, and the claw portion and a wall surface of the inserted portion are hooked by each other together with completion of insertion of the claw portion into the inserted portion at the closing position. That is, the first engagement holding body 34a and the second engagement holding body 34b may be formed such that the lid body 32 is held to the accommodation body 31 at the closing position as the claw portion and the wall surface of the inserted portion hooked by each other. The claw portion is formed as a claw-shaped protruding portion in one of the first engagement holding body 34a and the second engagement holding body 34b. The inserted portion is a groove or a through-hole, which is formed in the other one of the first engagement holding body 34a and the second engagement holding body 34b, and one of a plurality of wall surfaces forming the groove or the through-hole becomes a locking surface on which the claw portion is hooked. In the first engagement holding body 34a and the second engagement holding body 34b, the claw portion is inserted into the inserted portion as the rotating movement of the lid body 32 toward the closing position side progresses, and a locking surface of the claw portion and the locking surface of the inserted portion are arranged to oppose each other at the closing position together with the completion of the insertion. Thus, the locking surface of the claw portion and the locking surface of the inserted portion are hooked by each other, when the lid body 32 tries to move to the opening position with respect to the accommodation body 31 in the first engagement holding body 34a and the second engagement holding body 34b, so that the lid body 32 can be held to the accommodation body 31 at the closing position. The locking surface of the claw portion and the locking surface of the inserted portion may be brought into contact with each other at the closing position or may be brought into contact with each other as the lid body 32 at the closing position moves toward the opening position side. Similarly, the first engagement holding body 35a and the second engagement holding body 35b may be formed in the second holding mechanism 35 such that the accommodation body 31 and the lid body 32 can be held by a claw portion and an inserted portion configured as above.

Between the first electric wire accommodation chamber 43 side and the first lid body 51 in the accommodation body 31, the first engagement holding body 34a and the second engagement holding body 34b of the first holding mechanism 34 have an engagement holding structure in which a claw portion is provided in one of the holding bodies and an inserted portion (portion to which the claw portion is inserted) is provided in the other holding body. In addition, between the first electric wire accommodation chamber 43 side and the first lid body 51 in the accommodation body 31, the first engagement holding body 35a and the second engagement holding body 35b of the second holding mechanism 35 have an engagement holding structure in which a claw portion is provided in one of the holding bodies and an inserted portion (portion to which the claw portion is inserted) is provided in the other holding body. The engagement holding structure is formed using the claw portion and the inserted portion. In the first holding mechanism 34, the first engagement holding body 34a is formed on the outer wall portion 43b side (the outer wall portion 43b and the periphery thereof) so as to have an inserted portion $34a_1$ (FIGS. 4, 7, and 9), and the second engagement holding body 34b is formed on the outer end portion 51b so as to have a claw portion $34b_1$ (FIGS. 3, 4, 7, and 9). In this first holding mechanism 34, a locking surface $34a_{11}$ (FIGS. 7 and 9) of the inserted portion $34a_1$ and a locking surface $34b_{11}$ (FIGS. 7 and 9) of the claw portion $34b_1$ are arranged to oppose each other at the closing position. In the second holding mechanism 35, the first engagement holding body 35a is formed on the inner wall portion 43a side (the inner wall portion 43a and the periphery thereof) so as to have an inserted portion $35a_1$ (FIGS. 4, 8, and 10), and the second engagement holding body 35b is formed on the inner end portion 51a so as to have a claw portion $35b_1$ (FIGS. 3, 4, 8, and 10). In this second holding mechanism 35, a locking surface $35a_{11}$ (FIGS. 8 and 10) of the inserted portion $35a_1$ and a locking surface $35b_{11}$ (FIGS. 8 and 10) of the claw portion $35b_1$ are arranged to oppose each other at the closing position.

Figure 11:
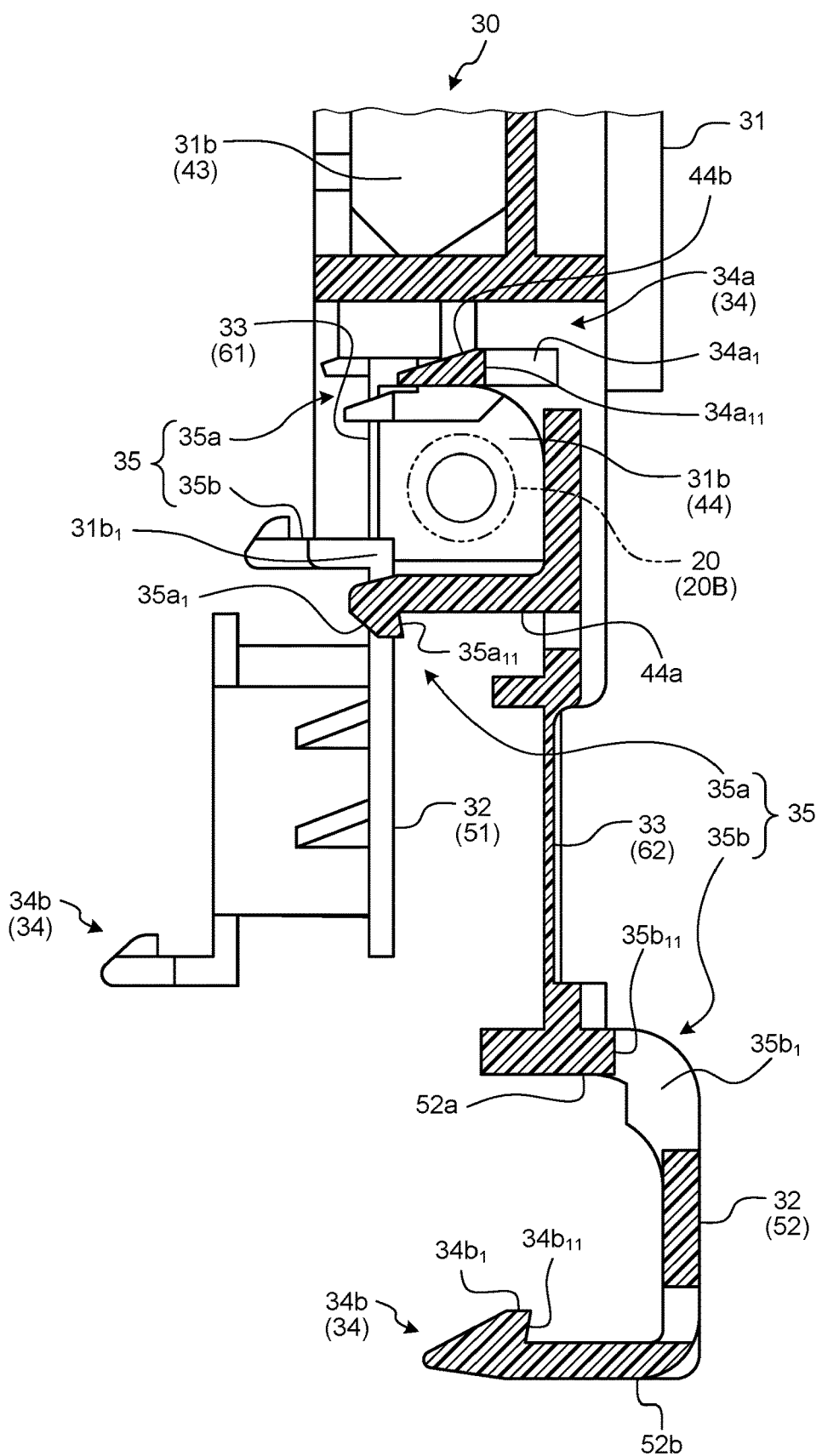
FIG. 11 is a cross-sectional view taken along a line X3-X3 of FIG. 4 and is an enlarged view of the first and second holding mechanisms.
Figure 12:
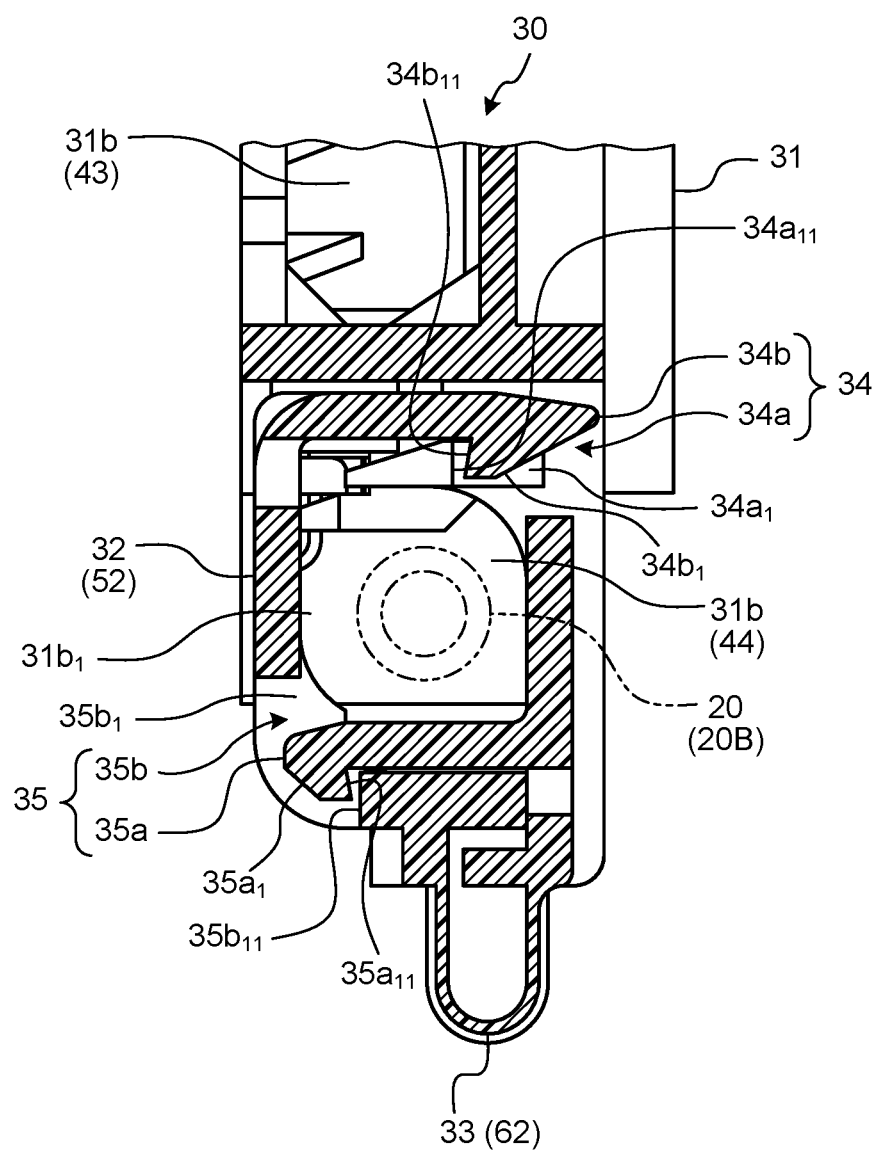
FIG. 12 is a cross-sectional view taken along a line Y3-Y3 of FIG. 6, and is an enlarged view of the first and second holding mechanisms.

Even between the second electric wire accommodation chamber 44 side and the second lid body 52 in the accommodation body 31, the first engagement holding body 34a and the second engagement holding body 34b of the first holding mechanism 34 have an engagement holding structure in which a claw portion is provided in one of the holding bodies and an inserted portion (portion to which the claw portion is inserted) is provided in the other holding body. In addition, even in the second holding mechanism 35, the first engagement holding body 35a and the second engagement holding body 35b have an engagement holding structure in which a claw portion is provided in one of the holding bodies and an inserted portion (portion in which the claw portion is inserted) is provided in the other holding body between the second electric wire accommodation chamber 44 side and the second lid body 52 in the accommodation body 31. In the first holding mechanism 34, the first engagement holding body 34a is formed on the outer wall portion 44b side (the outer wall portion 44b and the periphery thereof) so as to have an inserted portion $34a_1$ (FIGS. 4, 11, and 12), and the second engagement holding body 34b is formed on the outer end portion 52b so as to have a claw portion $34b_1$ (FIGS. 3, 4, 11, and 12). In this first holding mechanism 34, a locking surface $34a_{11}$ (FIGS. 11 and 12) of the inserted portion $34a_1$ and a locking surface $34b_{11}$ (FIGS. 11 and 12) of the claw portion $34b_1$ are arranged to oppose each other at the closing position. In the second holding mechanism 35, the first engagement holding body 35a is formed on the inner wall portion 44a side (the inner wall portion 44a and the periphery thereof) so as to have a claw portion $35a_1$ (FIGS. 3, 4, 11, and 12), and the second engagement holding body 35b is formed on the inner end portion 52a so as to have an inserted portion $35b_1$ (FIGS. 4, 11, and 12). In this second holding mechanism 35, a locking surface $35a_{11}$ (FIGS. 11 and 12) of the claw portion $35a_1$ and a locking surface $35b_{11}$ (FIGS. 11 and 12) of the inserted portion $35b_1$ are arranged to oppose each other at the closing position.

As described above, the conductive module 1 of the present embodiment includes the first holding mechanism 34 to hold the side of the lid body 32 opposite the hinge body 33 in the accommodation body 31 at the closing position, and the second holding mechanism 35 to hold the hinge body 33 side of the lid body 32 to the accommodation body 31 at the closing position. Accordingly, the conductive module 1 can keep holding the lid body 32 to the accommodation body 31 at the closing position without any change by the first holding mechanism 34 and the second holding mechanism 35 even if any state of the hinge body 33 is formed together with the progress of the deterioration of durability as the opening and closing of the lid body 32 are repeated. In addition, this conductive module 1 can keep holding the lid body 32 to the accommodation body 31 at the closing position without any change by the first holding mechanism 34 and the second holding mechanism 35 even if any state of the hinge body 33 is formed due to vibration or an external input during traveling of the vehicle. In this manner, the conductive module 1 according to the present embodiment can maintain the closed state of the opening $31b_1$ using the lid body 32, and thus, it is possible to prevent the second conductive member 20 from protruding from the opening $31b_1$ and to suppress the deterioration of durability and deterioration of a function. In particular, the opening $31b_1$ thereof faces the intersecting direction (orthogonal direction in the specific example) with respect to the vehicle vertical direction in the conductive module 1 of the present embodiment so that the second conductive member 20 may protrude from the opening $31b_1$ under the influence of gravity unless the closed state of the opening $31b_1$ using the lid body 32 is maintained. However, the lid body 32 is maintained at the closing position by the first holding mechanism 34 on the vehicle upper side and the second holding mechanism 35 on the vehicle lower side in this conductive module 1, and thus, it is possible to prevent the second conductive member 20 from protruding from the opening $31b_1$ regardless of the state of the hinge body 33.

A conductive module according to the present embodiment includes a first holding mechanism to hold a side of a lid body opposite a hinge body in an accommodation body at a closing position and a second holding mechanism to hold a hinge body side of the lid body to the accommodation body at the closing position. Accordingly, the conductive module can keep holding the lid body to the accommodation body at the closing position without any change by the first holding mechanism and the second holding mechanism even if any state of the hinge body is formed together with the progress of the deterioration of durability as the opening and closing of the lid body are repeated. In addition, this conductive module can keep holding the lid body to the accommodation body at the closing position without any change by the first holding mechanism and the second holding mechanism even if any state of the hinge body is formed due to vibration or an external input during traveling of a vehicle. In this manner, the conductive module according to the present embodiment can maintain the closed state of the opening using the lid body, and thus, it is possible to prevent the second conductive member from protruding from the opening and to suppress the deterioration of durability and deterioration of a function.

Although the invention has been described with respect to the specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A conductive module comprising:
a first conductive member that is electrically connected to at least one electrode terminal of a battery module in which a plurality of battery cells each having positive and negative electrode terminals are arranged;
a second conductive member that extends in an arrangement direction of the plurality of battery cells and is electrically connected to the first conductive member and an electrical connection target; and
an accommodation member in which the first and second conductive members are accommodated, wherein
the accommodation member includes
an accommodation body that has a first accommodation chamber in which the first conductive member is accommodated and a second accommodation chamber in which the second conductive member is accommodated,
a lid body that closes an opening of the second accommodation chamber such that the second conductive member does not come out of the second accommodation chamber, the lid body includes an inner end and an outer end,
a hinge body that is a living hinge connecting the second accommodation chamber side of the accommodation body and the inner end of the lid body such that the inner end is located between the outer end and the hinge body, and rotates the lid body with respect to the accommodation body between an opening position with respect to the opening of the second accommodation chamber and a closing position with respect to the opening of the second accommodation chamber,
a first holding mechanism that holds the outer end of the lid body onto the accommodation body at the closing position, and
a second holding mechanism that holds the inner end of the lid body onto the accommodation body at the closing position.

2. The conductive module according to claim 1, wherein
the second accommodation chamber is arranged so as to open the opening in a direction intersecting with a vehicle vertical direction,
the hinge body is arranged so as to connect the lid body to the accommodation body on a vehicle lower side with respect to the second accommodation chamber,
the first holding mechanism is configured to hold a vehicle upper side of the lid body to the accommodation body at the closing position, and
the second holding mechanism is configured to hold a vehicle lower side of the lid body to the accommodation body at the closing position.

3. The conductive module according to claim 1, wherein each of the first holding mechanism and the second holding mechanism includes a first engagement holding body provided on the accommodation body and a second engagement holding body provided on the lid body, and is formed such that the lid body is held to the accommodation body at the closing position by engaging the first engagement holding body and the second engagement holding body with each other at the closing position.

4. The conductive module according to claim 2, wherein each of the first holding mechanism and the second holding mechanism includes a first engagement holding body provided on the accommodation body and a second engagement holding body provided on the lid body, and is formed such that the lid body is held to the accommodation body at the closing position by engaging the first engagement holding body and the second engagement holding body with each other at the closing position.

5. The conductive module according to claim 1, wherein
the first conductive member is electrically connected to an electrode terminal serving as a total positive electrode or a total negative electrode in the battery module, and
the second conductive member is a power cable that includes a core wire extending in the arrangement direction of the plurality of battery cells and a sheath covering the core wire, and electrically connects the first conductive member and an inverter serving as the electrical connection target.

6. The conductive module according to claim 2, wherein
the first conductive member is electrically connected to an electrode terminal serving as a total positive electrode or a total negative electrode in the battery module, and
the second conductive member is a power cable that includes a core wire extending in the arrangement direction of the plurality of battery cells and a sheath covering the core wire, and electrically connects the first conductive member and an inverter serving as the electrical connection target.

7. The conductive module according to claim 3, wherein
the first conductive member is electrically connected to an electrode terminal serving as a total positive electrode or a total negative electrode in the battery module, and
the second conductive member is a power cable that includes a core wire extending in the arrangement direction of the plurality of battery cells and a sheath covering the core wire, and electrically connects the first conductive member and an inverter serving as the electrical connection target.

8. The conductive module according to claim 4, wherein
the first conductive member is electrically connected to an electrode terminal serving as a total positive electrode or a total negative electrode in the battery module, and
the second conductive member is a power cable that includes a core wire extending in the arrangement direction of the plurality of battery cells and a sheath covering the core wire, and electrically connects the first conductive member and an inverter serving as the electrical connection target.

9. The conductive module according to claim 1, wherein
the first conductive member electrically connects two electrode terminals adjacent to each other in the arrangement direction of the plurality of battery cells, and
the second conductive member is a voltage detection line that includes a core wire extending in the arrangement direction of the plurality of battery cells and a sheath covering the core wire, and electrically connects the first conductive member and a battery monitoring unit serving as the electrical connection target.

10. The conductive module according to claim 2, wherein
the first conductive member electrically connects two electrode terminals adjacent to each other in the arrangement direction of the plurality of battery cells, and
the second conductive member is a voltage detection line that includes a core wire extending in the arrangement direction of the plurality of battery cells and a sheath covering the core wire, and electrically connects the first conductive member and a battery monitoring unit serving as the electrical connection target.

11. The conductive module according to claim 3, wherein
the first conductive member electrically connects two electrode terminals adjacent to each other in the arrangement direction of the plurality of battery cells, and
the second conductive member is a voltage detection line that includes a core wire extending in the arrangement direction of the plurality of battery cells and a sheath covering the core wire, and electrically connects the first conductive member and a battery monitoring unit serving as the electrical connection target.

12. The conductive module according to claim 4, wherein
the first conductive member electrically connects two electrode terminals adjacent to each other in the arrangement direction of the plurality of battery cells, and
the second conductive member is a voltage detection line that includes a core wire extending in the arrangement direction of the plurality of battery cells and a sheath covering the core wire, and electrically connects the first conductive member and a battery monitoring unit serving as the electrical connection target.

* * * * *